United States Patent
Taguchi

(10) Patent No.: US 9,312,780 B2
(45) Date of Patent: Apr. 12, 2016

(54) LEAKAGE CURRENT DETECTION AND SWITCHED ON/OFF COMPENSATING CURRENT

(71) Applicant: DAIKIN INDUSTRIES,LTD., Osaka-shi, Osaka (JP)

(72) Inventor: Yasutaka Taguchi, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 14/374,456

(22) PCT Filed: Oct. 18, 2012

(86) PCT No.: PCT/JP2012/076919
§ 371 (c)(1),
(2) Date: Jul. 24, 2014

(87) PCT Pub. No.: WO2013/111403
PCT Pub. Date: Aug. 1, 2013

(65) Prior Publication Data
US 2015/0009725 A1   Jan. 8, 2015

(30) Foreign Application Priority Data

Jan. 27, 2012   (JP) .................................. 2012-015428

(51) Int. Cl.
*H02M 5/45* (2006.01)
*H02M 5/458* (2006.01)
(Continued)

(52) U.S. Cl.
CPC ................ *H02M 5/458* (2013.01); *H02M 7/48* (2013.01); *H02M 1/4225* (2013.01); *H02M 2001/0048* (2013.01); *H02M 2001/123* (2013.01); *H02P 27/06* (2013.01); *H02P 2201/15* (2013.01)

(58) Field of Classification Search
CPC .......... H02M 1/12; H02M 7/537; H02P 27/06
See application file for complete search history.

(56) References Cited

U.S. PATENT DOCUMENTS 4,975,259 A    12/1990   Hyakutake et al.
6,134,126 A *  10/2000   Ikekame et al. ................. 363/39
(Continued)

FOREIGN PATENT DOCUMENTS

EP    0809346 A1    11/1997
JP    1-122910 A    5/1989
(Continued)

OTHER PUBLICATIONS

Fairchild Semiconductor. "Fan 7930 Critical Condcution Mode PFC Controller". Rev. 1.1, Apr. 2010, pp. 1-22.*
(Continued)

*Primary Examiner* — Harry Behm
*Assistant Examiner* — Peter Novak
(74) *Attorney, Agent, or Firm* — Birch, Stewart, Kolasch & Birch, LLP

(57) ABSTRACT

A converter to which an alternating current is inputted from an AC power supply rectifies the alternating current to output it to a DC link. An inverter is connected through the DC link to the converter and converts a direct current into an alternating current to output it to a load. A leakage current detector outputs a detection current corresponding to a leakage current leaking from the load. A compensating current output end is connected to a location where the leakage current leaks, and outputs a compensating current compensating for the leakage current in response to the detection current. A switch sets whether to input the detection current to the compensating current output section or not.

18 Claims, 5 Drawing Sheets

(51) Int. Cl.
*H02M 7/48* (2007.01)
*H02M 1/12* (2006.01)
*H02P 27/06* (2006.01)
*H02M 1/42* (2007.01)
*H02M 1/00* (2007.01)

(56) References Cited

U.S. PATENT DOCUMENTS

| | | | |
|---|---|---|---|
| 6,151,228 A | 11/2000 | Miyazaki et al. | |
| 7,053,505 B2 * | 5/2006 | Tsuruya | H02M 1/15 307/105 |
| 7,659,797 B2 * | 2/2010 | Tucker | H02M 1/12 333/167 |
| 2002/0171473 A1 | 11/2002 | Pelly | |

FOREIGN PATENT DOCUMENTS

| | | |
|---|---|---|
| JP | 11-122910 A | 4/1999 |
| JP | 2000-92861 A | 3/2000 |
| JP | 3044650 B2 | 5/2000 |
| JP | 2001-186770 A | 7/2001 |

OTHER PUBLICATIONS

International Search Report issued in PCT/JP2012/076919, dated Jan. 22, 2013.

Son et al., "Conducted EMI in PWM Inverter for Household Electric Appliance," IEEE Transactions on Industry Applications, vol. 38, No. 5, Sep./Oct. 2002, pp. 1370-1379.

* cited by examiner

F I G. 4
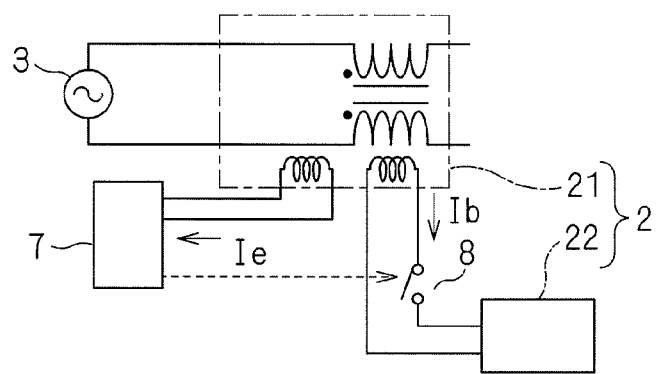
F I G. 5
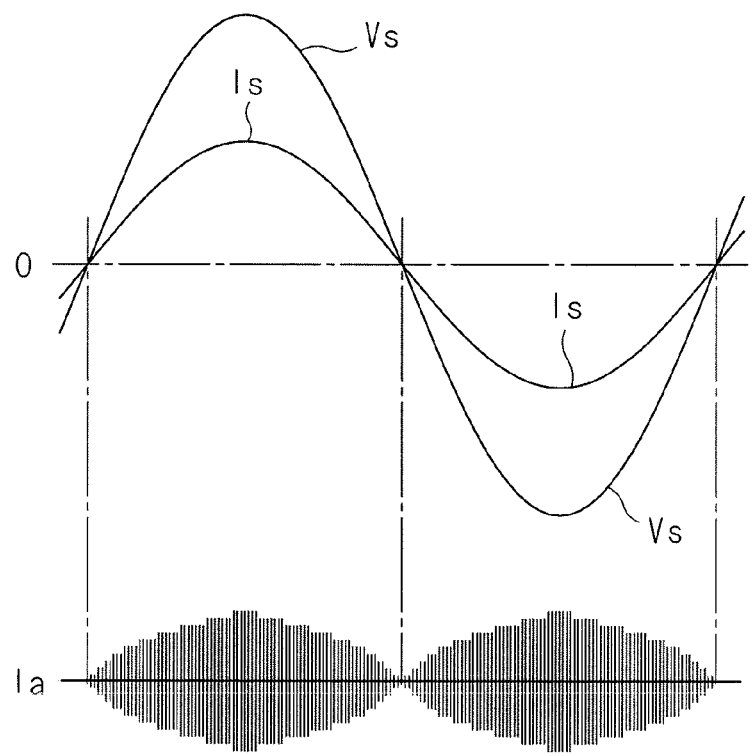

US 9,312,780 B2

LEAKAGE CURRENT DETECTION AND SWITCHED ON/OFF COMPENSATING CURRENT

TECHNICAL FIELD

The present invention relates to a technique for reducing a leakage current from aloud.

BACKGROUND ART

Techniques for reducing a leakage current from a load have hitherto been proposed. For example, Japanese Patent No. 3044650 and Japanese Patent Application Laid-Open No. 11-122910 (1999) to be described below disclose techniques such that a compensating current supply circuit connected across a smoothing capacitor outputs a current which compensates for a leakage current from a load.

In a structure provided with no smoothing capacitor in Japanese Patent Application Laid-Open No. 2000-92861, a noise reduction circuit is provided between positive and negative input lines providing a connection between a diode bridge serving as a full-wave rectifier circuit and an inverter device. The noise reduction circuit has two transistors which perform the operation of turning on and off so as to be in states opposite to each other.

SUMMARY OF INVENTION

Problems to be Solved by the Invention

In the techniques described in Japanese Patent No. 3044650 and Japanese Patent Application Laid-Open No. 11-122910 (1999), the compensating current supply circuit operates based on a DC voltage after smoothing. In the technique described in Japanese Patent Application Laid-Open No. 2000-92861, no smoothing capacitor is employed, but the two transistors in the noise reduction circuit are driven to turn on and off by amplifying the voltage that detects a detected leakage current, by means of an amplifier.

Thus, the compensating current is outputted independently of the waveform of an alternating current inputted to the full-wave rectifier circuit in the technique described in any of Japanese Patent No. 3044650, Japanese Patent Application Laid-Open No. 11-122910 (1999), and Japanese Patent Application Laid-Open No. 2000-92861.

FIG. 5 is a graph schematically showing a relationship between a leakage current Ia, and an AC voltage Vs and an AC current Is which are inputted to a full-wave rectifier circuit in the case where no smoothing capacitor is employed. The leakage current Ia increases with the increase in input current Is. There is a similar tendency when a smoothing capacitor is employed but the voltage across the smoothing capacitor is pulsating.

Thus, the circuit which compensates for the leakage current operates in Japanese Patent No. 3044650, Japanese Patent Application Laid-Open No. 11-122910 (1999), and Japanese Patent Application Laid-Open No. 2000-92861 even when it is not necessary to reduce the leakage current Ia which is small. This is not desirable from the viewpoint of savings in power consumption.

The present invention has been made to solve such problems. It is therefore an object of the present invention to output a compensating current except during an interval where a leakage current is not pronounced to thereby reduce losses resulting from the passage of the compensating current.

Means for Solving the Problems

A first aspect of a power conversion circuit according to the present invention comprises: a converter (11) for converting an alternating current into a direct current; a DC link (15); an inverter (14) connected through said DC link to said converter and for converting a direct current into an alternating current to output the alternating current to a load (4); a leakage current detector (21) for outputting a detection current (Ib) corresponding to a leakage current (Ia) leaking from said load; a compensating current output section (22) having a compensating current output end (223) for outputting a compensating current (Ic) compensating for said leakage current in response to said detection current, said compensating current output end being connected to a location (41) where the leakage current of said load leaks; and a switch (8) for setting whether to input said detection current to said compensating current output section or not.

A second aspect of the power conversion circuit according to the present invention is the first aspect thereof, and further comprises a controller (7) for controlling the opening and closing of said switch (8), based on a monitor current (Ie) proportional to said detection current (Ib). Said leakage current detector (21) has a first coil which passes said detection current (Ib) from a difference between a pair of currents flowing in said converter (11), and a second coil in which said monitor current flows, said second coil being inductively coupled to said first coil.

A third aspect of the power conversion circuit according to the present invention is the first aspect thereof, and further comprises a controller (7) for controlling the opening and closing of said switch (8), based on the amplitude of an AC voltage (Vs) inputted to said converter (11).

A fourth aspect of the power conversion circuit according to the present invention is any one of the first to third aspects thereof, wherein said DC link (15) includes a smoothing capacitor (13).

A fifth aspect of the power conversion circuit according to the present invention is any one of the first to fourth aspects thereof, wherein said DC link (15) includes a boost chopper circuit (12).

A sixth aspect of the power conversion circuit according to the present invention is the fifth aspect thereof, wherein said switch (8) is conducting/non-conducting in corresponding relation to the driving/stop, respectively, of said boost chopper circuit (12).

A seventh aspect of the power conversion circuit according to the present invention is any one of the first to sixth aspects thereof, wherein: said compensating current output section (22) includes a first transistor (221) and a second transistor (222) which are connected in series between a pair of input ends (224, 225) of said compensating current output section; said first transistor and said second transistor are different in conductivity type from each other; a control electrode of said first transistor and a control electrode of said second transistor are connected in common; a connection point where said first transistor and said second transistor are connected to each other is connected to said compensating current output end (223); and said detection current flows between said connection point and the control electrodes of said first and second transistors.

Effects of the Invention

In the first aspect of the power conversion circuit according to the present invention, the switch allows the compensating current to be outputted only during an interval where the leakage current is pronounced. This reduces losses resulting from the passage of the compensating current.

In the second or third aspect of the power conversion circuit according to the present invention, the decrease in detection current due to the monitor current is reduced.

In the fourth aspect of the power conversion circuit according to the present invention, the DC voltage inputted to the inverter is smoothed. This makes it easy to control the inverter.

In the fifth and sixth aspects of the power conversion circuit according to the present invention, the DC voltage outputted from the converter is boosted. This improves the power factor of the power conversion circuit.

In particular, the sixth aspect is capable of reducing power consumption when the boost chopper circuit is stopped.

In the seventh aspect of the power conversion circuit according to the present invention, the compensating current corresponding to the leakage current is passed from the connection point to the location where leakage occurs.

These and other objects, features, aspects and advantages of the present invention will become more apparent from the following detailed description of the present invention when taken in conjunction with the accompanying drawings.

BRIEF DESCRIPTION OF DRAWINGS

FIG. 4 is a circuit diagram showing a modification of the embodiment of the power conversion circuit according to the present invention;

FIG. 5 is a graph showing a relationship between a leakage current, and the waveforms of an AC voltage and an AC current which are inputted to a converter.

DESCRIPTION OF EMBODIMENTS

Figure 1:
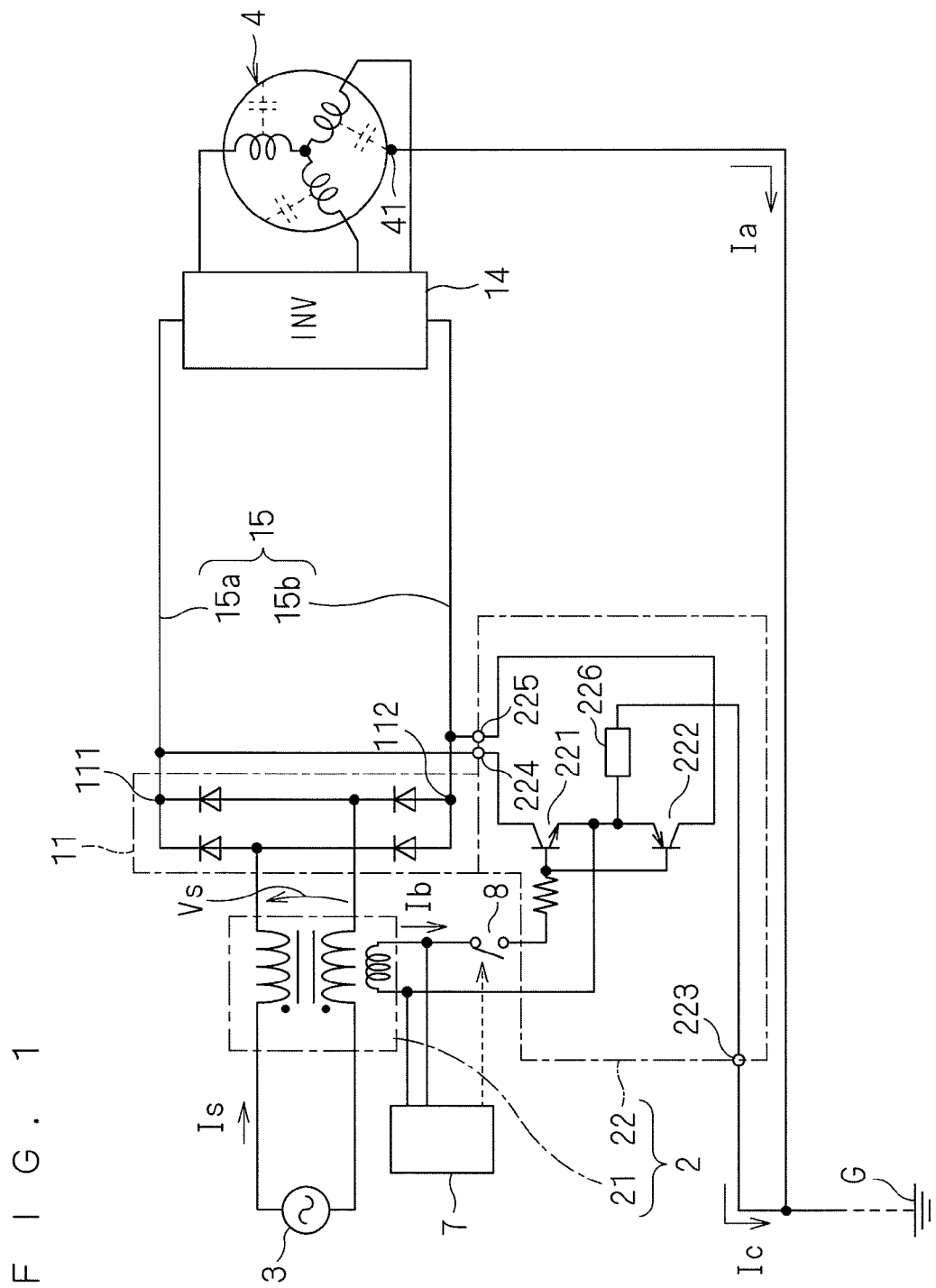
FIG. 1 is a circuit diagram showing a configuration of a power conversion circuit according to an embodiment of the present invention together with its surroundings.

FIG. 1 is a circuit diagram showing a configuration of a power conversion circuit according to an embodiment the present invention together with its surroundings. The power conversion circuit includes a converter 11, a DC link 15, an inverter 14, and a leakage current reduction device 2.

The converter 11 converts an alternating current inputted from an AC power supply 3 into a direct current. The inverter 14 converts a direct current into an alternating current to output the alternating current to a load 4. The inverter 14 is connected through the DC link 15 to the converter 11. An AC voltage Vs and an AC current Is are inputted to the converter 11.

The DC link 15 includes a DC power line 15$a$ on a positive side and a DC power line 15$b$ on a negative side.

In FIG. 1, a diode bridge is illustrated by way of example as the converter 11. However, an active converter which employs pulse width modulation may be used as another example of the converter 11.

An example of the load 4 is a motor for use in a compressor for compressing a refrigerant for an air conditioner. The motor is exposed to the refrigerant and a lubricating oil together with compressing elements in the compressor. Thus, the motor has a stray capacitance between the motor and the contour of the compressor. In particular, the dielectric constant of the refrigerant increases in a state of what is called "migration" such that the lubricating oil is dissolved in the refrigerant. This increases the stray capacitance to make the generation of a leakage current pronounced.

The leakage current reduction device 2 outputs a compensating current Ic which compensates for a leakage current Ia leaking from the load 4. The leakage current reduction device 2 includes a leakage current detector 21, a compensating current output section 22 and a switch 8.

The leakage current detector 21 outputs a detection current Ib corresponding to the leakage current Ia from a difference between a pair of currents inputted to the converter 11. Specifically, the leakage current detector 21 has, for example, a common mode choke provided between the AC power supply 3 and the converter 11, and a coil inductively coupled to the common mode choke. Thus, the detection current Ib flows in the coil. Such a configuration itself is well known in the art, for example, from Japanese Patent No. 3044650 Japanese Patent Application Laid-Open No. 11-122910 (1999), and Japanese Patent Application Laid-Open No. 2000-92861 described above, and will not be described in detail.

The compensating current output section 22 has a pair of input ends 224 and 225, and a compensating current output end 223. The compensating current output section 22 is connected in parallel to the DC link 15 through the input ends 224 and 225. The compensating current output end 223 outputs the compensating current Ic. The compensating current Ic compensates for the leakage current Ia in response to the detection current Ib. The compensating current output end 223 is connected to a location 41 where the leakage current of the load 4 leaks. The location 41 is connected, for example, to a ground G. Alternatively, a parasitic impedance is present between the ground G and the location 41. The possibility that the parasitic impedance is present is indicated by a broken line between the location 41 and the ground G in FIG. 1 and the subsequent figures.

Specifically, the compensating current output section 22 includes, for example, transistors 221 and 222 connected in series between the pair of input ends 224 and 225 thereof. The transistors 221 and 222 are different in conductivity type from each other. Specifically, the transistor 221 is of PNP type, and the transistor 222 is of NPN type. A connection point where the transistors 221 and 222 are connected to each other is connected to the compensating current output end 223. The detection current Ib flows between the connection point and the bases of the transistors 221 and 222 when the switch 8 to be described later is conducting.

Specifically, the base serving as a control electrode of the transistor 221 and the base serving as a control electrode of the transistor 222 are connected, for example, through a resistor (and also through the switch 8 as will be described later) to the leakage current detector 21. The detection current Ib flows in the resistor, so that a base bias voltage is applied to the transistors 221 and 222.

The compensating current Ic flows from the compensating current output end 223 to the location 41. It is, however, desirable to provide an element 226 having a capacitive impedance, e.g. a capacitor, between the compensating current output end 223 and the location 41 for the purpose of cutting a direct current component from the compensating current Ic.

The configuration itself of the compensating current output section 22 is also well known in the art, for example, from Japanese Patent No. 3044650, Japanese Patent Application Laid-Open No. 11-122910 (1999), and Japanese Patent Application Laid-Open No. 2000-92861 described above, and will not be described in detail.

The switch 8 sets whether to input the detection current Ib to the compensating current output section 22 or not. Specifically, the switch 8 is provided, for example, between the resistor connected to the bases of the transistors 221 and 222 and the leakage current detector 21. The opening and closing control of the switch 8 is controlled by a controller 7.

An instance where the controller 7 detects the voltage across the coil in which the detection current Ib is obtained is shown in FIG. 1. However, there is apprehension about the decrease in monitor current Ie when the controller 7 has a low input impedance.

FIG. 4 is a circuit diagram of a modification of the power conversion circuit winch shows only a limited area around the controller 7. In the modification shown in FIG. 4, the leakage current detector 21 has a first coil in which the detection current Ib flows, and a second coil in which the monitor current Ie flows, the second coil being inductively coupled to the first coil. The controller 7 is capable of controlling the opening and closing of the switch 8, based on the monitor current Ie, because the monitor current Ie is proportional to the detection current Ib. In this case, the monitor current Ie is less prone to decrease even when the controller 7 has a low input impedance.

The controller 7 makes judgments to be described below, for example, about the voltage across the aforementioned coil or about the monitor current Ie to control the opening and closing of the switch 8.

(i) To cause the switch 8 to conduct only when the magnitude of an instantaneous value is greater than a predetermined threshold value;

(ii) to cause the switch 8 to conduct only when the magnitude of an average value is greater than a predetermined threshold value; and (iii) to cause the switch 8 to conduct only when the magnitude of a peak value (AM detection) is greater than a predetermined threshold value.

Thus, the compensating current output section 22 passes the compensating current Ic except during an interval where the leakage current Ia is not pronounced.

Alternatively, the controller 7 may cause the switch 8 to conduct only when the absolute value of the AC voltage Vs is greater than a predetermined threshold value, whereby the compensating current Ic is passed except during an interval where the leakage current Ia is not pronounced. This is because the smaller the absolute value of the AC voltage Vs is, the smaller the leakage current Ia is, as shown in FIG. 5.

In this case, the AC voltage Vs is inputted to the controller 7. Alternatively, the voltage at the DC link 15 is inputted to the controller 7 when ti e converter 11 performs full-wave rectification, e.g. when the converter 11 is formed by a diode bridge. The monitor current Ie is less prone to decrease even when such configurations are used.

The controller 7 includes, for example, a microcomputer and a storage device. The microcomputer executes processing steps (in other words, procedures) described in programs. The aforementioned storage device may include one or more storage devices such as, for example, a ROM (Read Only Memory), a RAM (Random Access Memory), a rewritable nonvolatile memory (EPROM (Erasable Programmable ROM) or the like), and a hard disk device. The storage device stores therein various pieces of information, data or the like, and also stores therein programs executed by the microcomputer. The storage device also provides a work area for the execution of the programs. It should be noted that the microcomputer may be understood to function as various means corresponding to the respective processing steps described in the programs or to implement the various functions corresponding to the respective processing steps. The controller 7 is not limited to this, but some or all of the various procedures to be executed by the controller 7, or the various means or various functions to be implemented may be implemented by means of hardware.

For example, a relay contact or a semiconductor switch may be used for the switch 8.

Figure 2:
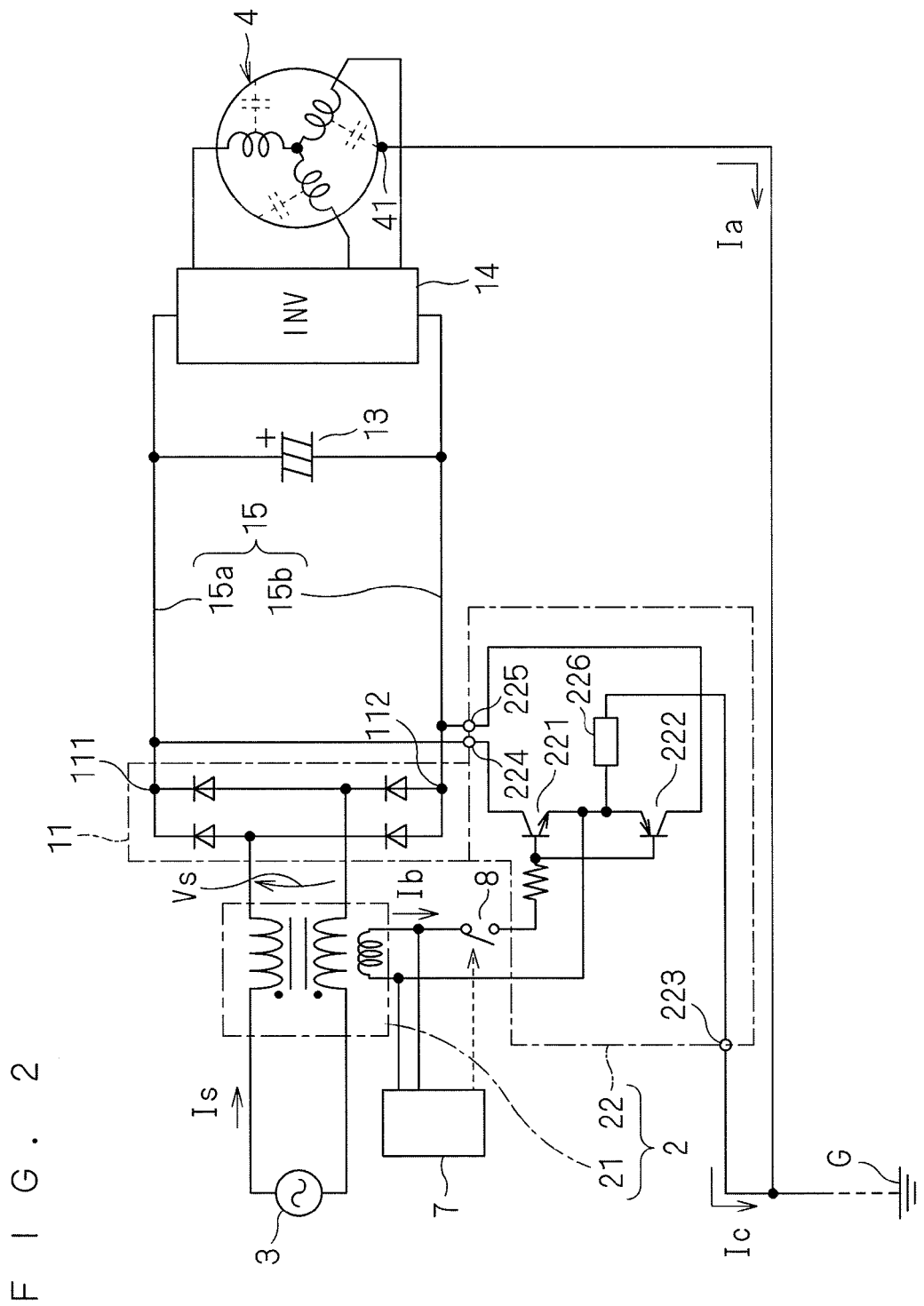
FIG. 2 is a circuit diagram showing another configuration of the power conversion circuit according to the embodiment of the present invention together with its surroundings.

FIG. 2 is a circuit diagram showing another configuration of the power conversion circuit together with its surroundings. This configuration differs from the configuration shown in FIG. 1 in that the DC link 15 further includes a smoothing capacitor 13. Specifically, the smoothing capacitor 13 is connected between the DC power lines 15a and 15b. Although a capacitor having a large capacitance, such as an electrolytic capacitor, is used in ordinary cases, a capacitor having a small capacitance, such as a film capacitor, may be used by suitably controlling the inverter 14. In the latter case, the smoothing function is not necessarily required, and large pulsation occurs in the DC link 15.

When such large pulsation occurs, a voltage at the DC link 15 may be inputted to the controller 7 in place of the monitor current Ie. This is because such pulsation reflects variations in AC voltage Vs. Thus, the detection current Ib is provided to the compensating current output section 22 by opening and closing the switch 8 so that the compensating current Ic is outputted in a region where the absolute value of the AC voltage Vs is small. On the other hand, when the smoothing capacitor 13 has a large capacitance and the pulsation of the voltage at the DC link 15 is small, it is not desirable to input the voltage at the DC link 15 in place of the monitor current Ie to the controller 7.

Of course, the controller 7 may open and close the switch 8, based on the voltage across the coil in which the detection current Ib flows, the monitor current Ie or the AC voltage Vs, to pass the compensating current Ie except during an interval where the leakage current Ia is not pronounced.

Figure 3:
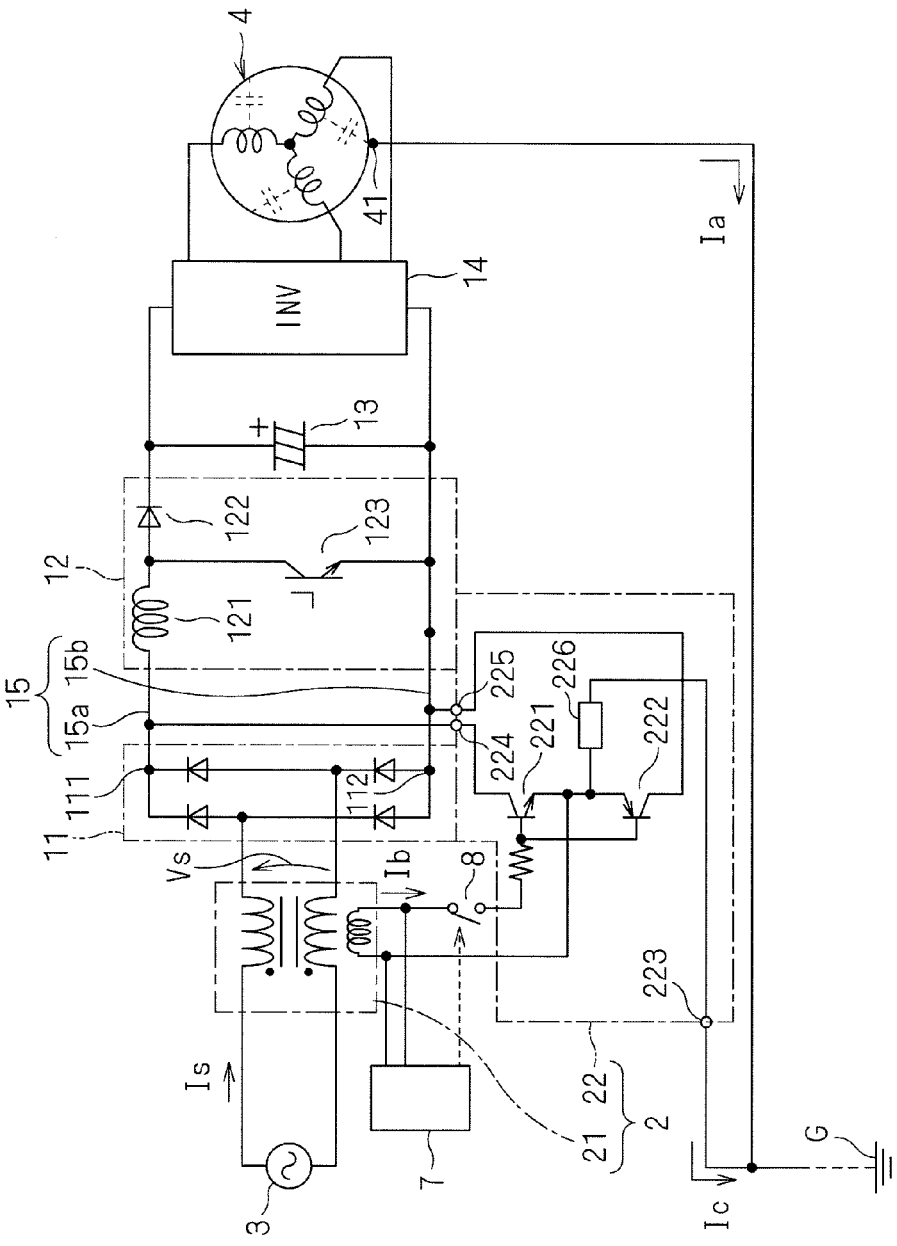
FIG. 3 is a circuit diagram showing still another configuration of the power conversion circuit according to the embodiment of the present invention together with its surroundings.

FIG. 3 is a circuit diagram showing still another configuration of the power conversion circuit together with its surroundings. This configuration differs from the configuration shown in FIG. 1 in that the DC link 15 further includes a boost chopper circuit 12. It should be noted that an instance in which the smoothing capacitor 13 is further included to be connected to an output of the boost chopper circuit 12 is illustrated in FIG. 3.

The boost chopper circuit 12 has a reactor 121, a diode 122, and a switching element 123. The reactor 121 is connected to the DC power line 15a. The anode of the diode 122 is connected through the reactor 121 to the DC power line 15a. The smoothing capacitor 13 is connected between the cathode of the diode 122 and the DC power line 15b.

The switching element 123, which is used, for example an insulated gate bipolar transistor, is connected between the anode of the diode 122 and the DC power line 15b.

The use of such a configuration causes the boost chopper circuit 12 to boost a DC voltage outputted from the converter 11, thereby functioning as a power factor correction circuit for improving the power factor of the power conversion circuit. The details of the operation of the boost chopper circuit 12 are techniques well known in the art, and will not be described herein in detail.

Also, a configuration which operates in what is called an interleaving scheme may be used for the boost chopper circuit 12.

It should be noted that the power factor correction circuit is not always in operation in the power conversion circuit. For the aforementioned power conversion circuit used for the air conditioner, for example, there are cases where the switching element 123 continues to be off (referred to also as an "off state of the power factor correction circuit" hereinafter) and where the switching element 123 is switched according to a certain duty ratio (referred to also as an "on state of the power factor correction circuit" hereinafter).

In particular, when the converter 11 is formed by the diode bridge, the conduction angle of the diode bridge is wide in the on state of the power factor correction circuit. Thus, as in the case shown in FIG. 5, the AC current is has a gentle waveform, and the phase angle at which the leakage current Ia has a large value is wide. In such a case, it is hence desirable to suppress the timing of the passage of the compensating current Ic in the aforementioned manner.

Figure 6:
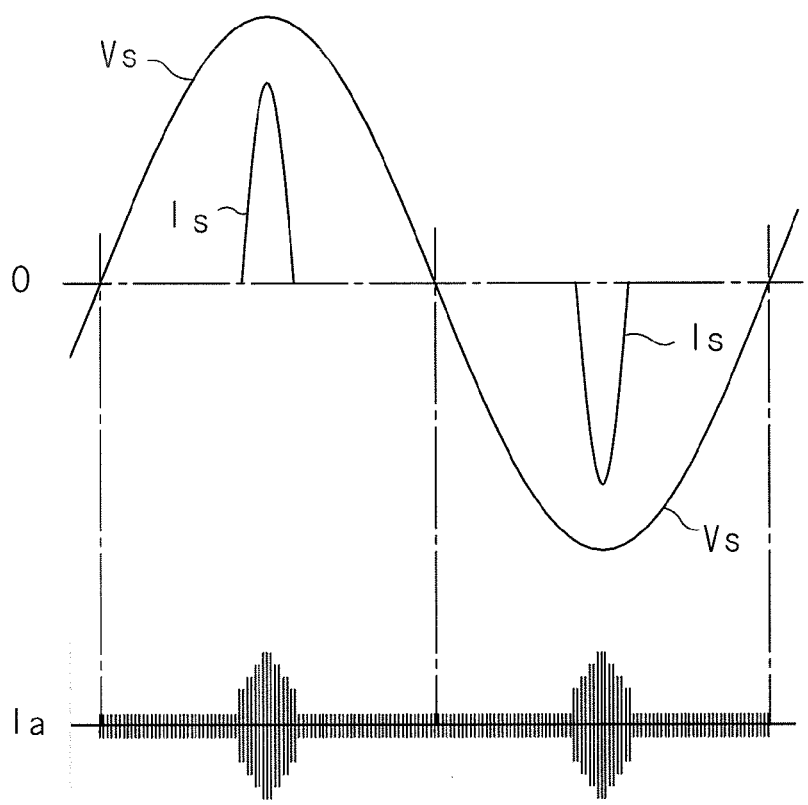
FIG. 6 is a graph showing another relationship between the leakage current, and the waveforms of the AC voltage and the AC current which are inputted to the converter.

However, the conduction angle of the diode bridge is narrow in the off state of the power factor correction circuit. FIG. 6 is a graph showing a relationship between the leakage current Ia, and the waveforms of the AC voltage Vs and the AC current is which are inputted to the converter 11 in such a case. The AC current Is has a steep waveform, and the range in which the leakage current Ia has a large value is narrow. Thus, the adverse effect of the leakage current on the outside is small without the passage of the compensating current Ic in the off state of the power factor correction circuit.

Thus, regardless of the monitor current Ie, the AC voltage Vs and the voltage in the DC link 15, power consumption is reduced by rendering the switch 8 non-conducting in the off state of the power factor correction circuit. That is, it is desirable that the switch 8 is conducting/non-conducting in corresponding relation to the driving/stop, respectively, of the boost chopper circuit 12. Such control of the switch 8 is achieved by the controller 7 in cooperation with another controller (not shown) which controls the boost chopper circuit 12. Such cooperation is easily achieved using known techniques, and will not be described herein.

Of course, even when the boost chopper circuit 12 is driven to cause the switch 8 to conduct, it is desirable that the switch 8 is rendered non-conducting under the control of the controller 7, based on the voltage across the coil in which the detection current Ib flows, the monitor current Ie or the like.

While the invention as been described in detail, the foregoing description is in all aspects illustrative and not restrictive. It is understood that numerous other modifications and variations which have not been illustrated can be devised without departing from the scope of the invention.

The invention claimed is:

1. A power conversion circuit comprising:
    a converter which converts an alternating current into a direct current;
    a DC link;
    an inverter, connected through said DC link to said converter, which converts a direct current into an alternating current to output the alternating current to a load;
    a leakage current detector which outputs a detection current corresponding to a leakage current leaking from said load;
    a compensating current output section having a compensating current output end which outputs a compensating current compensating for said leakage current in response to said detection current, said compensating current output end being connected to a location where the leakage current of said load leaks; and
    an open/closed switch which sets whether said detection current is input to said compensating current output section or not by switching between an open state and a closed state, said switch conducting said detection current into said compensating current output section while in said closed state, said switch blocking said detection current from flowing into said compensating current output section while in said open state.

2. The power conversion circuit according to claim 1, further comprising
    a controller that controls the opening and closing of said switch, based on a monitor current proportional to said detection current,
    wherein said leakage current detector has a first coil which passes said detection current from a difference between a pair of currents flowing in said converter, and a second coil, in which said monitor current flows being inductively coupled to said first coil.

3. The power conversion circuit according to claim 2, wherein
    said DC link includes a smoothing capacitor.

4. The power conversion circuit according to claim 2, wherein:
    said compensating current output section includes a first transistor and a second transistor which are connected in series between a pair of input ends of said compensating current output section;
    said first transistor and said second transistor are different in conductivity type from each other;
    a control electrode of said first transistor and a control electrode of said second transistor are connected in common;
    a connection point where said first transistor and said second transistor are connected to each other is connected to said compensating current output end; and
    said detection current flows between said connection point and the control electrodes of said first and second transistors.

5. The power conversion circuit according to claim 2, wherein
    said DC link includes a boost chopper circuit.

6. The power conversion circuit according to claim 5, wherein
    said DC link includes the boost chopper circuit, and
    said switch is conducting/non-conducting in corresponding relation to the driving/stop, respectively, of said boost chopper circuit.

7. The power conversion circuit according to claim 1, further comprising
    a controller that controls the opening and closing of said switch, based on the amplitude of an AC voltage inputted to said converter.

8. The power conversion circuit according to claim 7, wherein DC link includes a smoothing capacitor.

9. The power conversion circuit according to claim 7, wherein:
    said compensating current output section includes a first transistor and a second transistor which are connected in series between a pair of input ends of said compensating current output section;
    said first transistor and said second transistor are different in conductivity type from each other;
    a control electrode of said first transistor and a control electrode of said second transistor are connected in common;

a connection point where said first transistor and said second transistor are connected to each other is connected to said compensating current output end; and said detection current flows between said connection point and the control electrodes of said first and second transistors.

10. The power conversion circuit according to claim 7, wherein DC link includes a boost chopper circuit.

11. The power conversion circuit according to claim 10, wherein
said DC link includes the boost chopper circuit, and
said switch is conducting/non-conducting in corresponding relation to the driving/stop, respectively, of said boost chopper circuit.

12. The power conversion circuit according to claim 1, wherein
said DC link includes a smoothing capacitor.

13. The power conversion circuit according to claim 12, wherein:
said compensating current output section includes a first transistor and a second transistor which are connected in series between a pair of input ends of said compensating current output section;
said first transistor and said second transistor are different in conductivity type from each other;
a control electrode of said first transistor and a control electrode of said second transistor are connected in common;
a connection point where said first transistor and said second transistor are connected to each other is connected to said compensating current output end; and
said detection current flows between said connection point and the control electrodes of said first and second transistors.

14. The power conversion circuit according to claim 1, wherein
said DC link includes a boost chopper circuit.

15. The power conversion circuit according to claim 14, wherein:
said compensating current output section includes a first transistor and a second transistor which are connected in series between a pair of input ends of said compensating current output section;
said first transistor and said second transistor are different in conductivity type from each other;
a control electrode of said first transistor and a control electrode of said second transistor are connected in common;
a connection point where said first transistor and said second transistor are connected to each other is connected to said compensating current output end; and
said detection current flows between said connection point and the control electrodes of said first and second transistors.

16. The power conversion circuit according to claim 14, wherein
said DC link includes the boost chopper circuit, and
said switch is conducting/non-conducting in corresponding relation to the driving/stop, respectively, of said boost chopper circuit.

17. The power conversion circuit according to claim 16, wherein:
said compensating current output section includes a first transistor and a second transistor which are connected in series between a pair of input ends of said compensating current output section;
said first transistor and said second transistor are different in conductivity type from each other;
a control electrode of said first transistor and a control electrode of said second transistor are connected in common;
a connection point where said first transistor and said second transistor are connected to each other is connected to said compensating current output end; and
said detection current flows between said connection point and the control electrodes of said first and second transistors.

18. The power conversion circuit according to claim 1, wherein:
said compensating current output section includes a first transistor and a second transistor which are connected in series between a pair of input ends of said compensating current output section;
said first transistor and said second transistor are different in conductivity type from each other;
a control electrode of said first transistor and a control electrode of said second transistor are connected in common;
a connection point where said first transistor and said second transistor are connected to each other is connected to said compensating current output end; and
said detection current flows between said connection point and the control electrodes of said first and second transistors.

\* \* \* \* \*